United States Patent
Fukumoto

(10) Patent No.: US 9,004,415 B2
(45) Date of Patent: Apr. 14, 2015

(54) CLAMP

(75) Inventor: Mitsuru Fukumoto, Utsunomiya (JP)

(73) Assignee: Nifco Inc., Yokohama-shi, Kanagawa (JP)

( * ) Notice: Subject to any disclaimer, the term of this patent is extended or adjusted under 35 U.S.C. 154(b) by 0 days.

(21) Appl. No.: 13/806,544

(22) PCT Filed: Jun. 17, 2011

(86) PCT No.: PCT/JP2011/003487
§ 371 (c)(1), (2), (4) Date: Jan. 7, 2013

(87) PCT Pub. No.: WO2011/161923
PCT Pub. Date: Dec. 29, 2011

(65) Prior Publication Data
US 2013/0097818 A1     Apr. 25, 2013

(30) Foreign Application Priority Data

Jun. 21, 2010 (JP) .................................. 2010-140051

(51) Int. Cl.
*F16B 15/00* (2006.01)
*H02G 3/32* (2006.01)
(Continued)

(52) U.S. Cl.
CPC .............. *H02G 3/32* (2013.01); *F16B 19/1081* (2013.01); *F16B 2/14* (2013.01)

(58) Field of Classification Search
CPC ............. F16L 3/2235; F16L 3/13; F16L 3/04; F16L 3/12; F16L 3/22; F16B 21/073; F16B 21/071

USPC .................................. 248/51, 67.7, 71, 74.1
See application file for complete search history.

(56) References Cited

U.S. PATENT DOCUMENTS 2,937,834 A * 5/1960 Orenick et al. .................. 248/71
3,199,816 A * 8/1965 Weisz ............................. 248/71
(Continued)

FOREIGN PATENT DOCUMENTS

JP    H02-77380 U    6/1990
JP    H05-37623      9/1993
(Continued)

OTHER PUBLICATIONS

PCT, "International Search Report for PCT/JP2011/003487", Jul. 12, 2011.
(Continued)

*Primary Examiner* — Bradley Duckworth
(74) *Attorney, Agent, or Firm* — Manabu Kanesaka

(57) ABSTRACT

A clamp which is capable of being temporarily fastened relative to a cable is provided. The clamp is for fixing a cable to a vehicle body panel wherein a locking hole is formed. The clamp includes a base member including a groove portion having a bottom portion which can abut against at least one portion of an outer circumferential portion of the cable, and a leg portion which can engage with the locking hole; and a clamping member supported in the base member to be capable of being displaced between a temporarily fastened position and a completely fastened position, and demarcating a housing space, which can house the cable, between the bottom portion. An outer shape of the clamping member is structured such that the clamping member is displaced from the temporarily fastened position to the completely fastened position so as to reduce the housing space.

14 Claims, 16 Drawing Sheets

(51) Int. Cl.
*F16B 19/10* (2006.01)
*F16B 2/14* (2006.01)

(56) References Cited

U.S. PATENT DOCUMENTS

| | | | |
|---|---|---|---|
| 3,465,992 A * | 9/1969 | Schuplin | 248/71 |
| 3,517,901 A | 6/1970 | Jenkins | |
| 4,260,123 A * | 4/1981 | Ismert | 248/74.1 |
| 4,588,152 A * | 5/1986 | Ruehl et al. | 248/71 |
| 5,718,549 A | 2/1998 | Noda et al. | |
| 6,206,606 B1 * | 3/2001 | Mita et al. | 403/320 |
| 6,443,403 B1 * | 9/2002 | Page et al. | 248/71 |
| 6,715,720 B2 * | 4/2004 | Finn | 248/71 |
| 6,779,763 B2 * | 8/2004 | Miura et al. | 248/71 |
| 7,162,790 B1 * | 1/2007 | Daniels | 29/525.01 |
| 7,207,530 B2 * | 4/2007 | Ismert et al. | 248/74.4 |
| 8,342,460 B2 * | 1/2013 | Binkert et al. | 248/71 |
| 2002/0088905 A1 * | 7/2002 | Hansen | 248/65 |
| 2004/0144897 A1 * | 7/2004 | Maruyama | 248/68.1 |
| 2010/0133392 A1 * | 6/2010 | Hansen | 248/68.1 |
| 2013/0009019 A1 * | 1/2013 | Fukumoto | 248/67.5 |
| 2013/0009020 A1 * | 1/2013 | Shirakabe et al. | 248/74.1 |

FOREIGN PATENT DOCUMENTS

| | | |
|---|---|---|
| JP | 1995-16014 | 3/1995 |
| JP | H07-59232 A | 3/1995 |
| JP | 2006-161890 | 6/2006 |
| JP | 2009-228881 | 10/2009 |

OTHER PUBLICATIONS

Japan Patent Office, "Office Action for JP 2010-140051," Mar. 11, 2014.

China Patent Office, "Office Action for CN 201180030422.8," Mar. 3, 2014.

* cited by examiner

CLAMP

RELATED APPLICATIONS

The present application is National Phase of International Application No. PCT/JP2011/003487 filed Jun. 17, 2011, and claims priority from Japanese Application No. 2010-140051 filed Jun. 21, 2010.

FIELD OF TECHNOLOGY

The present invention relates to a clamp, more specifically, the clamp which fixes a cord-like body such as a cable and the like to a surface of a structure body such as a wall surface and the like.

BACKGROUND ART

As for the clamp fixing the cable to an attachment plate in which an attachment hole is formed, there is a clamp comprising an approximately C-shaped gripper surrounding an outside of an outer circumferential portion of the cable; two extending portions respectively provided to extend on both ends of the gripper; a notch portion formed in one of the extending portions; and a locking portion provided to protrude on the other of the extending portions (for example, Patent Document 1). In the clamp, the cable is disposed inside the gripper; both the extending portions are overlapped in such a way that the locking portion passes through the notch portion; and an end portion of the locking portion which has passed through the notch portion is engaged with the attachment hole, so that the cable is fixed to the attachment plate.

PRIOR ART DOCUMENT

Patent Document

Patent Document 1: Japanese Examined Utility Model Application Publication No. H05-37623

SUMMARY OF THE INVENTION

Problems to be Solved by the Invention

In the clamp of the Patent Document 1, however, by engaging the locking portion with the attachment hole, a connected state between the cable and the clamp is completed for the first time. Namely, by an engagement between the locking portion and the attachment hole, an engagement state between the gripper and the cable is maintained, so that there is a problem that only connecting (temporarily fastening) the clamp and the cable cannot be carried out. If the clamp and the cable can be temporarily fastened, the clamp and the cable can be integrally supplied to an assembly site, so that a worker can dispose the cable in a predetermined position only by connecting the clamp to a predetermined attachment portion so as to improve an attaching workability.

The present invention is made in view of the aforementioned problem, and an object thereof is to provide a clamp capable of temporarily fastening relative to the cable.

Means for Solving the Problems

In order to solve the aforementioned problem, the present invention is a clamp (10) for fixing a cord-like body (100) to an attached member (101) wherein a locking hole (106) is formed. The clamp (10) comprises a base member (11) including a receiving portion (20) which can abut against at least one portion of an outer circumferential portion of the cord-like body, and a leg portion (16) which can engage with the locking hole; and a clamping member (12) supported in the aforementioned base member to be capable of being displaced between a temporarily fastened position and a completely fastened position, and demarcating a housing space (60) which can house the cord-like body relative to the receiving portion. An outer shape of the clamping member is structured such that the clamping member is displaced from the temporarily fastened position to the completely fastened position so as to reduce the housing space.

According to the structure, the clamp can house the cord-like body between the clamping member and the receiving portion, and even in a state wherein the clamp is not connected to the attached member, the clamp can be attached to the cord-like body to cover the cord-like body. Also, the clamping member is displaced so as to be capable of changing a size of the housing space, so that in a case wherein the clamping member is in the temporarily fastened position, a relative movement relative to the cord-like body of the clamp is allowed. On the other hand, in a case wherein the clamping member is in the completely fastened position, fastening of the cord-like body by the clamp is enhanced so as to be capable of fixing a relative position of the clamp and the cord-like body.

Another aspect of the present invention is that in the base member, there is formed a support hole (24), and that the clamping member extends to an insertion end portion (42) from a base end portion (41). At least the insertion end portion is inserted into the support hole, and the clamping member is supported to be capable of being displaced between the temporarily fastened position whose insertion depth relative to the support hole is shallow, and the completely fastened position whose insertion depth relative to the support hole is deep. In a portion protruding from the support hole on the aforementioned base end portion side, the housing space is demarcated between the receiving portion, and the base end portion side protrudes to the receiving portion side further than the insertion end portion side.

According to the structure, by a simple operation of pushing the clamping member relative to the support hole in an axis line direction, the clamping member can be displaced from the temporarily fastened position to the completely fastened position so as to be capable of facilitating an attaching workability of the cord-like body.

Another aspect of the present invention is that the base member comprises a groove portion (19) including a bottom portion (20) and wall portions (21 and 22) respectively continuing on both sides of the bottom portion and opposing to each other. The receiving portion is provided on the bottom portion, and in one of the wall portions, there is formed the support hole in such a way as to face the other side of both the wall portions. Also, in the other of the wall portions, there is formed an insertion hole (25), which is a through-hole, in such a way as to face the support hole. The clamping member is inserted into the insertion hole and the support hole.

According to the structure, the cord-like body can be reliably held inside the groove portion. Also, the clamping member is inserted and passed through the insertion hole so as to be capable of preventing the clamping member from falling when the cord-like body is clamped between the clamping member and the receiving portion.

Another aspect of the present invention is that the receiving portion protrudes in a direction parallel to a longitudinal direction of the clamping member, and that the clamping member includes an expanded head portion (401) protruding to the aforementioned receiving portion side on the aforementioned base end portion.

According to the structure, the expanded head portion of the clamping member can prevent the cord-like body from being disengaged from the housing space.

Another aspect of the present invention is that the receiving portion comprises a hook portion (501) protruding to the aforementioned clamping member side on a protruding end thereof.

According to the structure, the hook portion of the receiving portion can prevent the cord-like body from being disengaged from the housing space.

Another aspect of the present invention is that the support hole extends into the leg portion, and that the clamping member is displaced from the temporarily fastened position to the completely fastened position so as to press the leg portion, so that the leg portion is expanded to an outer side in a radial direction of the support hole.

According to the structure, when the clamping member is displaced from the temporarily fastened position to the completely fastened position, at the same time, an engagement state between the leg portion and the locking hole of the attached member can be strengthened.

Another aspect of the present invention is that the support hole extends into the leg portion, and that the leg portion can engage with the locking hole, and includes an elastic claw (201) which can incline into the support hole. When the clamping member is in the temporarily fastened position, the clamping member allows the elastic claw to incline into the support hole. On the other hand, when the clamping member is in the completely fastened position, the clamping member abuts against the elastic claw, and prevents the elastic claw from inclining into the support hole.

According to the structure, when the clamping member is displaced from the temporarily fastened position to the completely fastened position, at the same time, the engagement state between the leg portion and the locking hole of the attached member can be strengthened.

Another aspect of the present invention is that a clamp (600) for fixing the cord-like body (100) to the attached member (101), wherein the locking hole (106) is formed, comprises the base member (11), in which the receiving portion (20) which can abut against at least one portion of the outer circumferential portion of the cord-like body, and the support hole (24) which is the through-hole, are formed; and the clamping member (12) extending from the base end portion (41) to the insertion end portion (42), passing through the support hole from the insertion end portion side, supported in the aforementioned base member to be capable of being displaced between the temporarily fastened position whose insertion depth relative to the support hole is shallow, and the completely fastened position whose insertion depth relative to the support hole is deep, and demarcating the housing space (60), which can house the cord-like body, relative to the receiving portion in the portion protruding from the support hole on the base end portion side. The clamping member is displaced from the temporarily fastened position to the completely fastened position, so that the base end portion side protrudes to the receiving portion side further than the insertion end portion side in such a way as to reduce the housing space. In a portion wherein the insertion end portion has passed through the support hole, the clamping member engages with the locking hole.

According to the structure, the clamp can be attached to the cord-like body to cover the cord-like body, and the clamping member is displaced so as to be capable of changing the size of the housing space. In the case wherein the clamping member is in the temporarily fastened position, the relative movement relative to the cord-like body of the clamp is allowed. On the other hand, in the case wherein the clamping member is in the completely fastened position, the fastening of the cord-like body by the clamp is enhanced so as to be capable of fixing the relative position of the clamp and the cord-like body. Also, there is no need for providing the leg portion, for engaging with the locking hole of the attached member, in the base member.

Effect of the Invention

In the clamp of the present invention, in a case wherein the clamping member is in the temporarily fastened position, the clamp can be connected to the cord-like body relatively movably. On the other hand, the clamp can strengthen a connected state between the clamp and the cord-like body by displacing the clamping member to the completely fastened position.

BEST MODES OF CARRYING OUT THE INVENTION

Hereinafter, with reference to the drawings, embodiments, wherein the present invention is applied to a clamp for arranging a parking brake cable of an automobile in a proper place of a vehicle body panel, will be explained in detail. In the following explanation, each direction will be determined based on coordinate axes shown in FIG. 1.

First Embodiment

Figure 1:
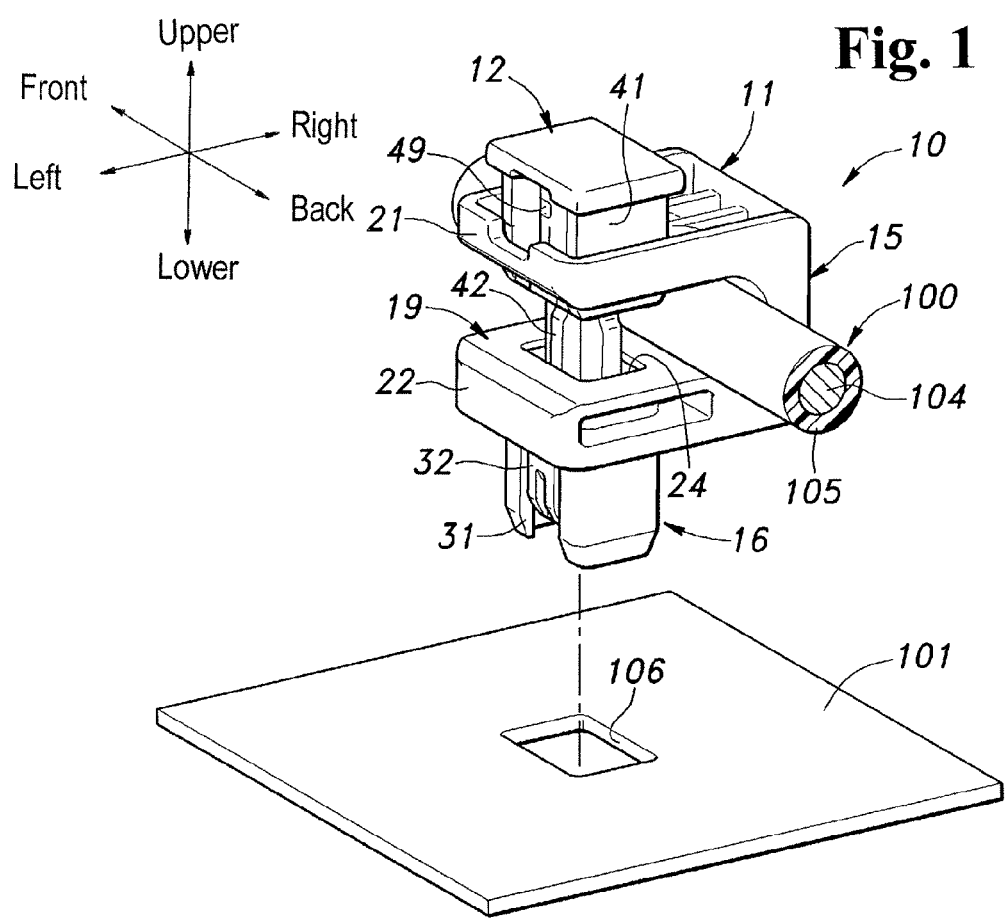
FIG. 1 is a perspective view showing an attachment structure of a cable to a vehicle body panel using a clamp according to the first embodiment.
Figure 2:
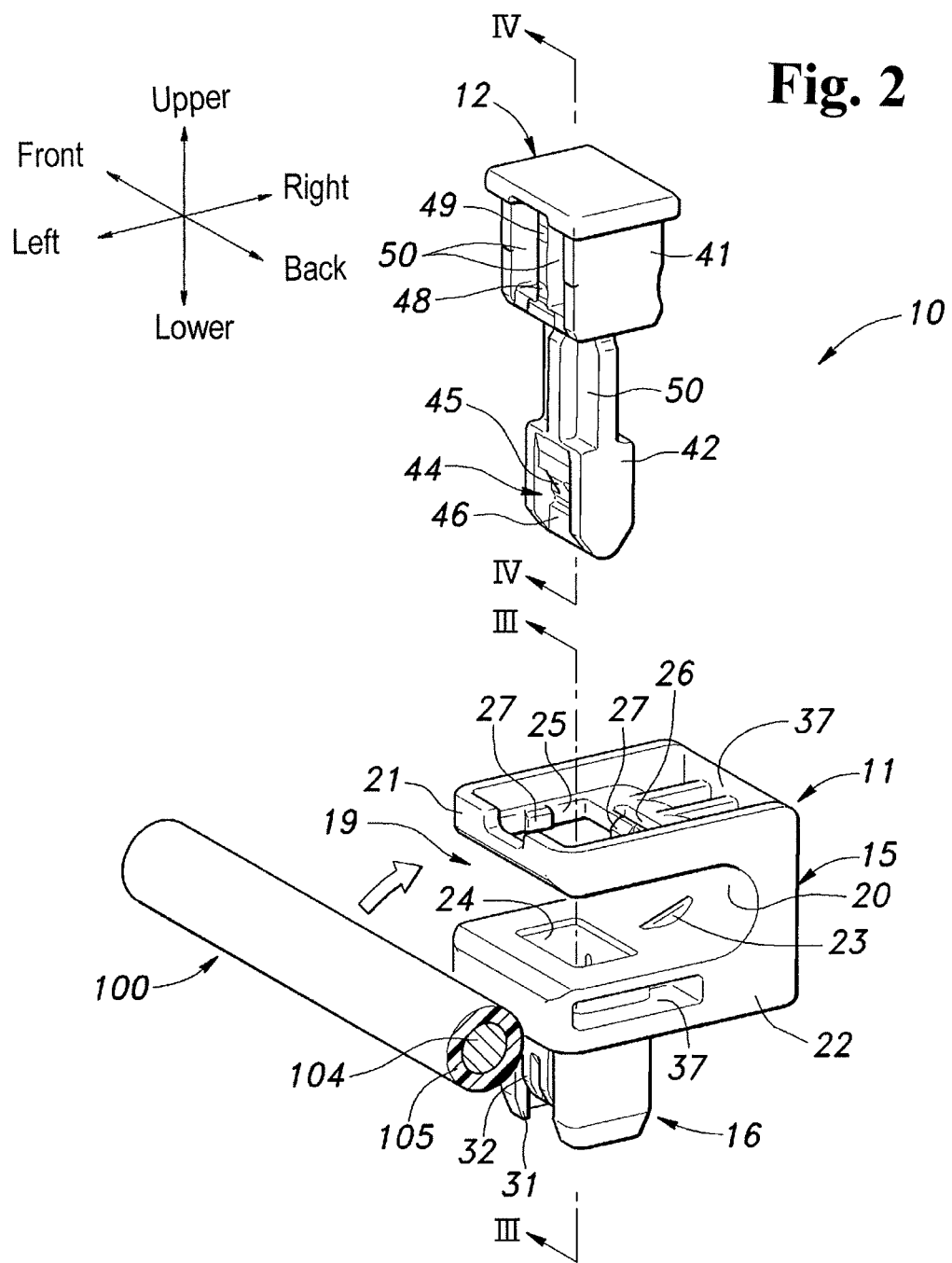
FIG. 2 is an exploded perspective view of the clamp according to the first embodiment.

As shown in FIGS. 1 and 2, a clamp 10 is for fixing a parking brake cable (hereinafter, called a cable) 100 as a cord-like body to a vehicle body panel (an attached member) 101 of the automobile. The clamp 10 comprises a base member 11 and a clamping member 12. The base member 11 and the clamping member 12 are formed by molding a resin material such as, for example, polyacetal (POM), polypropylene (PP), and the like.

Figure 3:
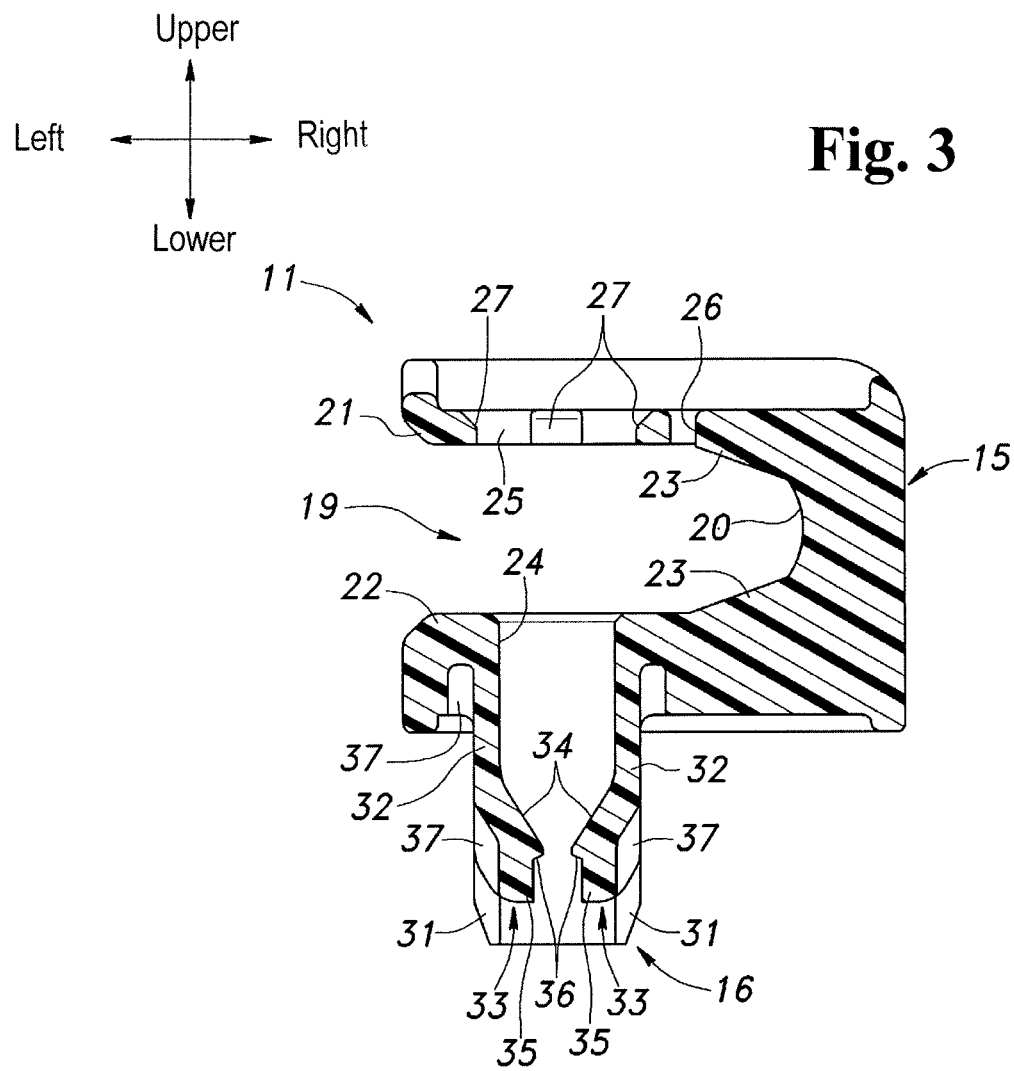
FIG. 3 is a cross-sectional view of a base member (a cross-sectional view taken along a line III to III in FIG. 2).

As shown in FIGS. 1 to 3, the base member 11 comprises an approximately cuboid-shaped main body portion 15, and an approximately cuboid-shaped leg portion 16 provided to protrude downwardly from a lower face of the main body portion 15. The main body portion 15 comprises a groove portion 19 which opens on a left side face thereof, and which is provided to extend in a front-and-back direction in such a way as to be communicated with a front side face thereof and a back side face. Due to the groove portion 19, the main body portion 15 has an approximately C shape. A bottom portion 20 positioned on a right end of the groove portion 19 is formed with a cross-sectional surface of a semicircular shape in such a way as to fit in with the cable 100 having a circular cross-sectional surface. Wall portions, respectively extending to a left side from both upper and lower ends of the bottom portion 20, comprise an upper wall portion 21 and a lower wall portion 22. In an inner face of the bottom portion 20, there is formed a plurality of protrusions 23. The protrusions 23 are preferably provided to extend in a right-and-left direction and/or in an up-and-down direction.

In the lower wall portion 22 and the leg portion 16, there is formed a support hole 24 having a square-shaped cross-sectional surface, which extends in the up-and-down direction, and passes through from an upper face of the lower wall portion 22 to a lower end of the leg portion 16. In the upper wall portion 21, there is formed an insertion hole 25 having a square-shaped cross-sectional surface, which passes through in the up-and-down direction, in the same axis as the support hole 24. In a planar view, each side of the support hole 24 and the insertion hole 25 extends in the right-and-left direction or the front-and-back direction, and the insertion hole 25 is formed larger than the support hole 24 in such a way as to surround an outside of the support hole 24.

In a portion adjacent to the insertion hole 25 of the upper wall portion 21, there is formed at least one lightening hole 26 passing through the upper wall portion 21 in the up-and-down direction. In the present embodiment, the lightening hole 26 is formed on a right side of the insertion hole 25. Due to the lightening hole 26, one portion of a hole wall of the insertion hole 25 is formed thinner so as to enhance flexibility. In a proper place of the hole wall of the insertion hole 25, there is formed a plurality of convex portions 27. At least one of the convex portions 27 is formed in a portion (a right-side portion of the hole wall) wherein flexibility is enhanced by the lightening hole 26 of the insertion hole 25. Thereby, at least one of the convex portions 27 can be displaced to an outer side in a radial direction of the insertion hole 25.

The leg portion 16 respectively includes notch portions 31 continuing to the lower end in a right-side wall portion thereof and a left-side wall portion. In an upper end portion of each notch portion 31, there are respectively provided to protrude elastic pieces 32 extending downwardly inside the notch portions 31. Each elastic piece 32 has flexibility, and by being elastically deformed, the elastic piece 32 can incline to an outer side of the leg portion 16. Each elastic piece 32 includes a bulging portion 33, which bulges in a mutually approaching direction, in a lower end portion thereof. Each bulging portion 33 comprises a taper portion 34, wherein a protruding amount in the mutually approaching direction increases as the bulging portion 33 goes to a lower side, on an upper half portion thereof. A lower half portion 35 of each bulging portion 33 is parallel to each other so as to have an equal distance between both the bulging portions 33. In a respective boundary portion between the taper portion 34 and the lower half portion 35, there is respectively formed a locking convex portion 36 protruding in the mutually approaching direction further than each taper portion 34.

In a proper place of the upper wall portion 21, the lower wall portion 22, and the elastic piece 32 of the base member 11, there is formed a thickness-thinned portion 37.

Figure 4:
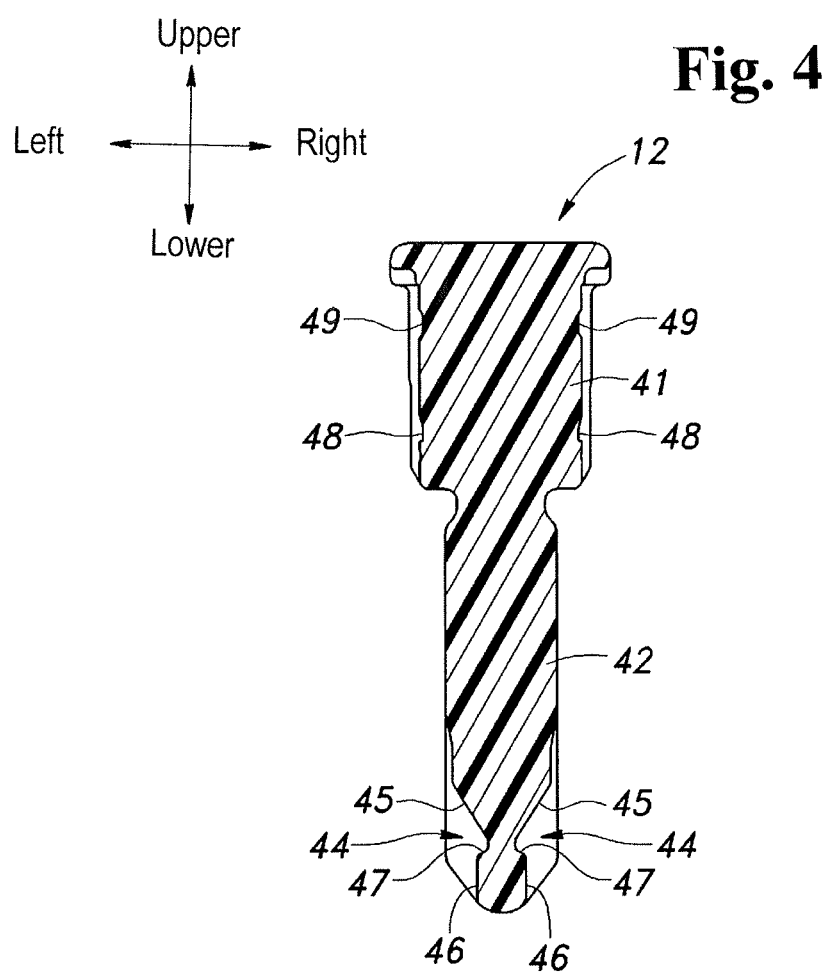
FIG. 4 is a cross-sectional view of a clamping member (a cross-sectional view taken along a line IV to IV in FIG. 2).
Figure 15:
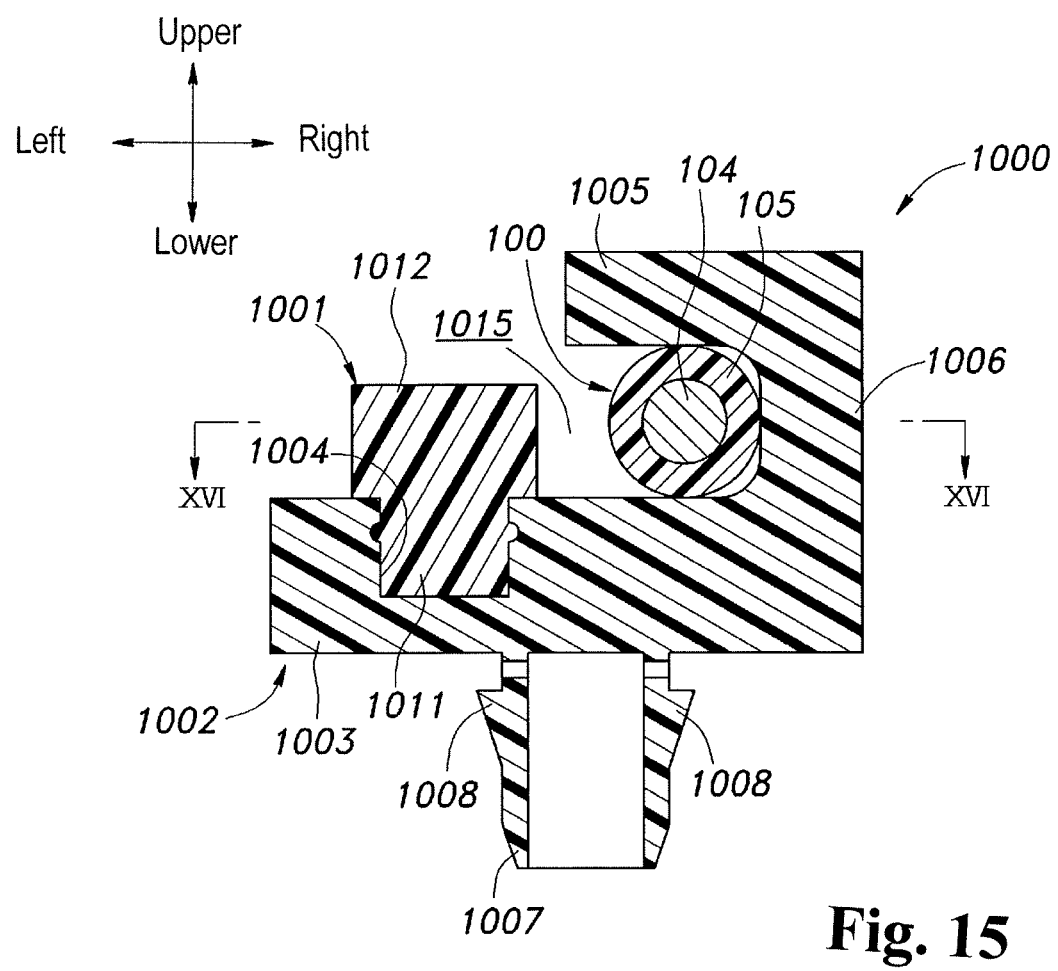
FIG. 15 is a cross-sectional view showing the temporarily fastened state of the cable by the clamp according to a tenth embodiment.

As shown in FIGS. 15 and 4, the clamping member 12 is an axis-like member extending in the up-and-down direction, and comprises a base end portion 41 positioned on an upper side, and an insertion end portion 42 concentrically continuing to a lower portion of the base end portion 41, and extending downwardly. The base end portion 41 increases a width in the right-and-left direction relative to the insertion end portion 42. The base end portion 41 is formed in a size insertable and passable through the insertion hole 25, and the insertion end portion 42 is formed in a size insertable into the support hole 24.

In the vicinity of an end (a lower end) of right-and-left lateral portions of the insertion end portion 42, there are respectively formed receiving concave portions 44 which can receive each bulging portion 33 of each elastic piece 32. As shown in FIG. 4, each receiving concave portion 44 includes a taper portion 45 whose depth increases as the taper portion 45 goes to an end side, on an upper half portion thereof. In a lower side of the taper portions 45, there are provided bottom portions 46 whose depth is roughly constant. The bottom portions 46 extend up to the end of the insertion end portion 42. In a boundary portion between the taper portions 45 and the bottom portions 46, there are formed locking concave portions 47 extending in the front-and-back direction, and whose depth is deepened more than the bottom portions 46.

In respective right-and-left lateral portions of the base end portion 41, there are respectively formed first locking concave portions 48 and second locking concave portions 49. The first locking concave portions 48 and the second locking concave portions 49 are disposed on an imaginary line extending in the up-and-down direction. The first locking concave portions 48 are formed on the lower side of the second locking concave portions 49.

In a proper place of the base end portion 41 and the insertion end portion 42 of the clamping member 12, there is formed a thickness-thinned portion 50.

Next, a procedure and an attachment structure thereof, wherein the cable 100 is attached to the vehicle body panel 101 using the clamp 10 according to the first embodiment, will be explained. As shown in FIG. 1, the parking brake cable 100 is structured by a metallic inner wire 104, and an outer case 105 formed by the resin material having flexibility, and slidably housing the inner wire 104. The vehicle body panel 101 is structured by a metal plate, and in the vehicle body panel 101, there is formed a locking hole 106 which is a square-shaped through-hole in which the leg portion 16 of the base member 11 can pass through.

First, as shown in FIG. 2, in a state wherein the base member 11 and the clamping member 12 are separated, the cable 100 is inserted into the groove portion 19 of the base member 11 from the radial direction. A distance between the upper wall portion 21 and the lower wall portion 22 of the groove portion 19 is formed in a size which can receive the cable 100. The cable 100 is inserted until the cable 100 comes to a right side more than the support hole 24 inside the groove portion 19.

In a state wherein the cable 100 is disposed inside the groove portion 19, the clamping member 12 is inserted into the insertion hole 25 of the base member 11 from an insertion end portion 42 side from above. The clamping member 12 runs into the support hole 24 after the clamping member 12 has passed through the insertion hole 25, and has crossed into the groove portion 19. The clamping member 12 fits in with the support hole 24 and the insertion hole 25, which have the square-shaped cross-sectional surface so as to control a rotation in an axial direction. When an insertion of the clamping member 12 relative to the support hole 24 proceeds, the elastic pieces 32 of the leg portion 16 are pressed against each bottom portion 46 of each receiving concave portion 44 of the insertion end portion 42 in each locking convex portion 36, and the elastic pieces 32 of the leg portion 16 elastically deform to the outer side of the leg portion 16. When the insertion of the clamping member 12 proceeds further, each locking convex portion 36 runs into each locking concave portion 47 of the insertion end portion 42, and the elastic pieces 32 return to an initial position by a restoring force. By an engagement between each locking convex portion 36 and each locking concave portion 47, the clamping member 12 is supported by the base member 11. At that time, a position of the clamping member 12 relative to the base member 11 is called a temporarily fastened position of the clamping member 12. Also, a state of the clamp 10 when the clamping member 12 is in the temporarily fastened position is called a temporarily fastened state (see FIG. 1 and FIG. 5).

Figure 5:
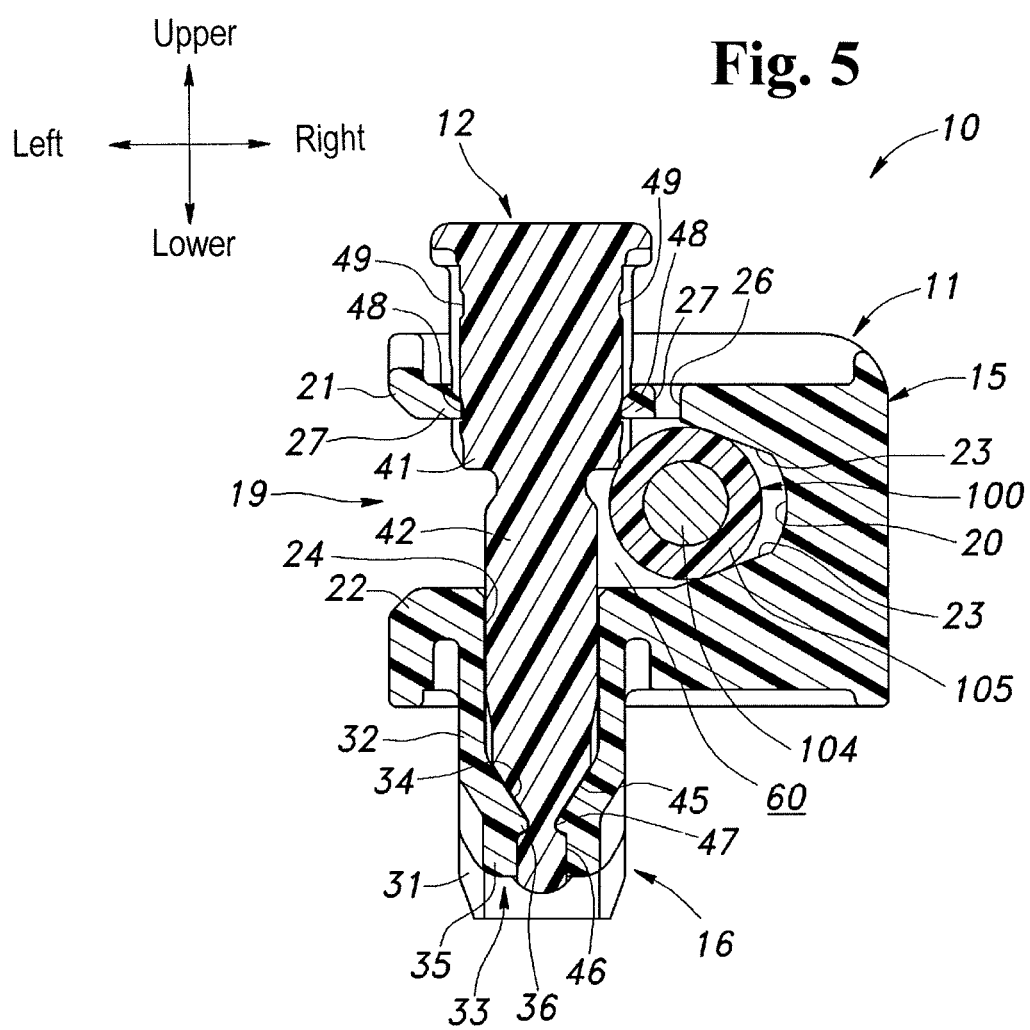
FIG. 5 is a cross-sectional view showing a temporarily fastened state of the cable by the clamp according to the first embodiment.

Also, as shown in FIG. 5, when the clamping member 12 is in the temporarily fastened position, the convex portions 27 of the insertion hole 25 of the base member 11 are engaged with the first locking concave portions 48 of the base end portion 41 of the clamping member 12. By engagements between the first locking concave portions 48 and the convex portions 27, the clamping member 12 is also supported in the temporarily fastened position relative to the base member 11. The width of the base end portion 41 in the right-and-left direction is slightly larger than a distance between the convex portions 27 formed in right-and-left inner walls of the insertion hole 25. When the base end portion 41 is inserted into the insertion hole 25, a portion corresponding to the lightening hole 26 of the insertion hole 25 elastically deforms, and allows the base end portion 41 to pass through.

In a state wherein the clamping member 12 is supported in the temporarily fastened position, a housing space 60 is demarcated between the bottom portion 20, the upper wall portion 21, and the lower wall portion 22 of the base member 11, and the clamping member 12, and the cable 100 is held inside the housing space 60. In a case wherein the clamping member 12 is in the temporarily fastened position, the most part of a portion, positioned inside the groove portion 19 of the clamping member 12, is the insertion end portion 42. Since the insertion end portion 42 has a width in the right-and-left direction narrower than the base end portion 41, the housing space 60 is relatively widened. At that time, a shape and a distance of the groove portion 19 and the clamping member 12 are set in such a way that the cable 100 can be displaced inside the housing space 60 in a longitudinal direction (an axis line direction) thereof.

Figure 6:
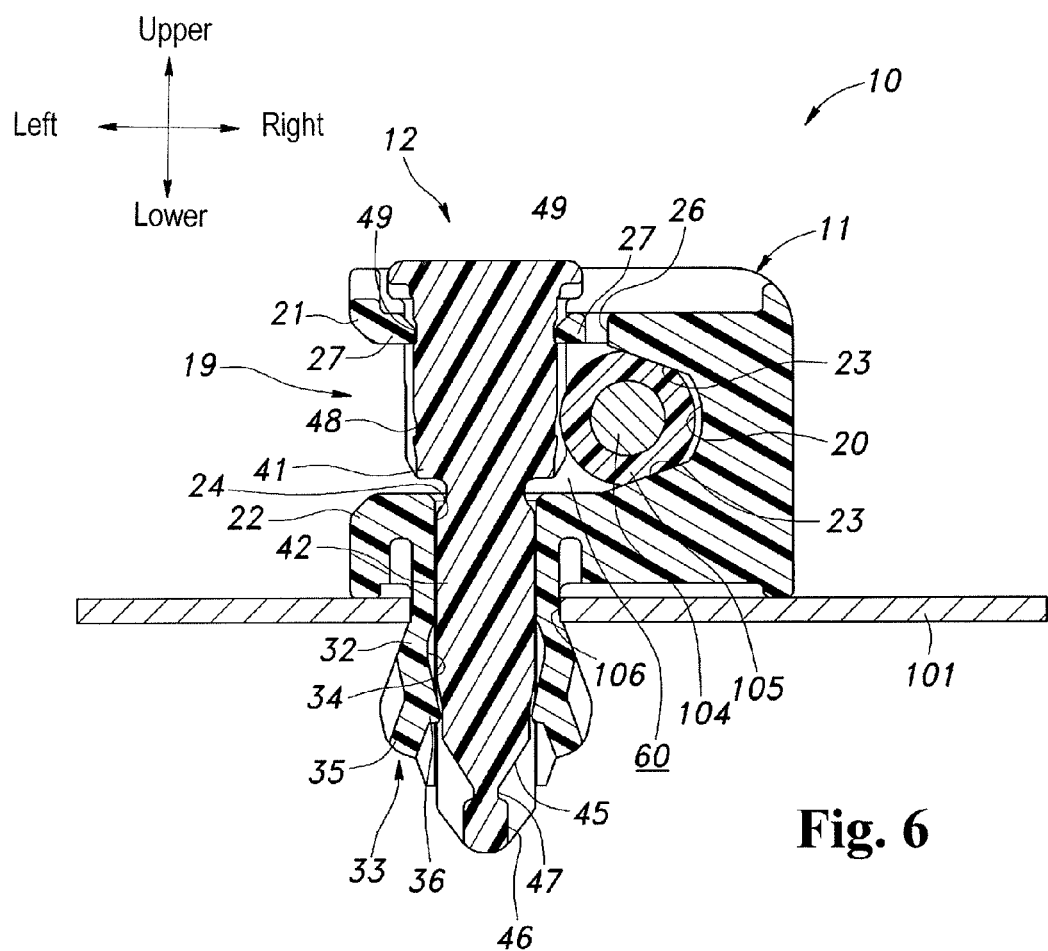
FIG. 6 is a cross-sectional view showing the attachment structure (a completely fastened state) of the cable to the vehicle body panel using the clamp according to the first embodiment.

Next, from the temporarily fastened state of the clamp 10 holding the cable 100, the clamp 10 is displaced in the longitudinal direction of the cable 100, and the leg portion 16 is corresponded to the locking hole 106 of the vehicle body panel 101 so as to insert the leg portion 16 into the locking hole 106. An insertion of the leg portion 106 relative to the locking hole 106 is carried out until a lower portion of the main body portion 15 of the base member 11 abuts against a surface of the vehicle body panel 101. From this state, when the clamping member 12 is pushed further relative to the insertion hole 25 and the support hole 24 of the base member 11, as shown in FIG. 6, the taper portion 45 of the insertion end portion 42 presses against the taper portion 34 of the elastic piece 32, and the elastic piece 32 is pushed out (is expanded) to the outer side of the leg portion 16. Thereby, a width of the leg portion 16 increases more than the locking hole 106 so as to become incapable of being detached from the locking hole 106. Also, at the same time, the convex portions 27 of the insertion hole 25 are disengaged from the first locking concave portions 48 so as to engage with the second locking concave portions 49. By engagements between the convex portions 27 and the second locking concave portions 49, an insertion depth of the clamping member 12 relative to the insertion hole 25 and the support hole 24 (the base member 11) is held. At that time, a position of the clamping member 12 relative to the base member 11 is called a completely fastened position of the clamping member 12. Also, a state of the clamp 10 when the clamping member 12 is in the completely fastened position is called a completely fastened state (see FIG. 6).

In a case wherein the clamping member 12 is in the completely fastened position, the most part of a portion, positioned inside the groove portion 19 of the clamping member 12, is the base end portion 41. Since the base end portion 41 has the width in the right-and-left direction narrower than the insertion end portion 42, the housing space 60 narrows compared to the temporarily fastened state. The cable 100 is pressed to a bottom portion 20 side by the base end portion 41, and is clamped between the base end portion 41 and the bottom portion 20 stronger than a time of the temporarily fastened state. Thereby, the cable 100 and the clamp 10 are prevented from being relatively displaced in the longitudinal direction of the cable 100. Also, the protrusions 23 formed in the bottom portion 20 bite into the outer case 105 of the cable 100, so that a relative position between the clamp 10 and the cable 100 is fixed more solidly.

As explained hereinbefore, the clamp 10 according to the first embodiment is attached to the cable 100 to cover the cable 100 displaceably in a state wherein the clamp 10 is separated from the vehicle body panel 101, and the temporarily fastened state can be formed. Thereby, for example, the clamp 10 can be supplied to a vehicle-body assembly site as one assembly body wherein the clamp 10 is assembled to the cable 100. Also, the clamp 10 can be displaced in the longitudinal direction of the cable 100 in the temporarily fastened state, and can adjust a position by conforming to a position of the locking hole 106 of the vehicle body panel 101. The clamp 10 can be attached to the vehicle body panel 101 only by inserting the leg portion 16 into the locking hole 106, and by pushing the clamping member 12 into the base member 11, so as to facilitate an attaching workability.

Also, the clamping member 12 changes the widths of the base end portion 41 and the insertion end portion 42 in the axis line direction. By displacing the clamping member 12 to the base member 11, the shortest distance between the clamping member 12 and the bottom portion 20 as a receiving portion shortens, and the housing space 60 is reduced. Thereby, the cable 100 is clamped more solidly between the clamping member 12 and the bottom portion 20, and the relative position of the clamp 10 and the cable 100 is fixed.

Second Embodiment

A clamp 200 according to a second embodiment has a different structure of the leg portion 16 compared to the clamp 10 according to the first embodiment. In the clamp 200, regarding the same structure as the clamp 10, the same reference numerals as the clamp 10 are assigned, and their explanations are omitted.

Figure 7:
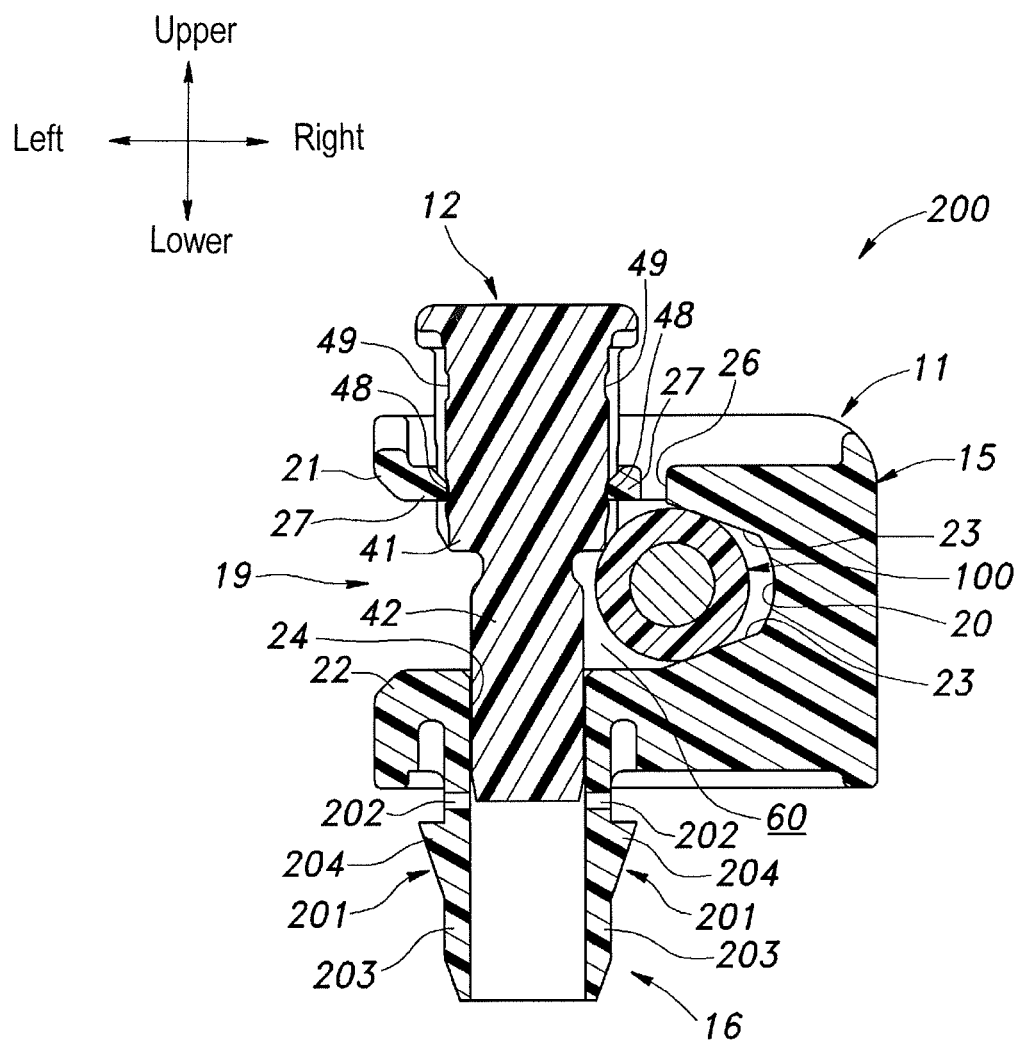
FIG. 7 is a cross-sectional view showing the temporarily fastened state of the cable by the clamp according to a second embodiment.

As shown in FIG. 7, the leg portion 16 of the clamp 200 respectively includes elastic claws 201 in right-and-left lateral wall portions thereof. The leg portion 16 passes through the support hole 24 in the up-and-down direction, and there are respectively formed inverted U-shaped notch portions 202, which connect an outside and the support hole 24, in the right-and-left lateral wall portions. The elastic claws 201 comprise cantilever-shaped elastic piece portions 203 extending upward from a base end portion of a lower end inside the notch portions 202; and check claw portions 204 provided to protrude on outer surfaces of the elastic piece portions 203. The elastic piece portions 203 have flexibility, and can incline to an inside (i.e., inside the support hole 24) of the leg portion 16. The first locking concave portions 48 engage with the convex portions 27 of the base member 11, so that the clamping member 12 is held in the temporarily fastened position. Also, the second locking concave portions 49 engage with the convex portions 27 of the base member 11, so that the clamping member 12 is held in the completely fastened position.

As shown in FIG. 7, in the case wherein the clamping member 12 is positioned in the temporarily fastened position, the elastic claws 201 can incline to the inside of the support hole 24. The elastic claws 201 incline, so that the leg portion 16 can be inserted into the locking hole 106 of the vehicle body panel 101. Although it is not shown in the figures, in the case wherein the clamping member 12 is positioned in the completely fastened position, the insertion end portion 42 of the clamping member 12 abuts against a back portion (a portion on a support hole 24 side) of the elastic claws 201 so as to prevent the elastic claws 201 from inclining. Due to the structure, the clamping member 12 can insert the leg portion 16 into the locking hole 106 in a state wherein the clamping member 12 is in the temporarily fastened position, and after that, the clamping member 12 is displaced to the completely fastened position so as to prevent the elastic claws 201 from inclining, and to be capable of retaining the leg portion 16 from the locking hole 106.

Third Embodiment

Figure 8:
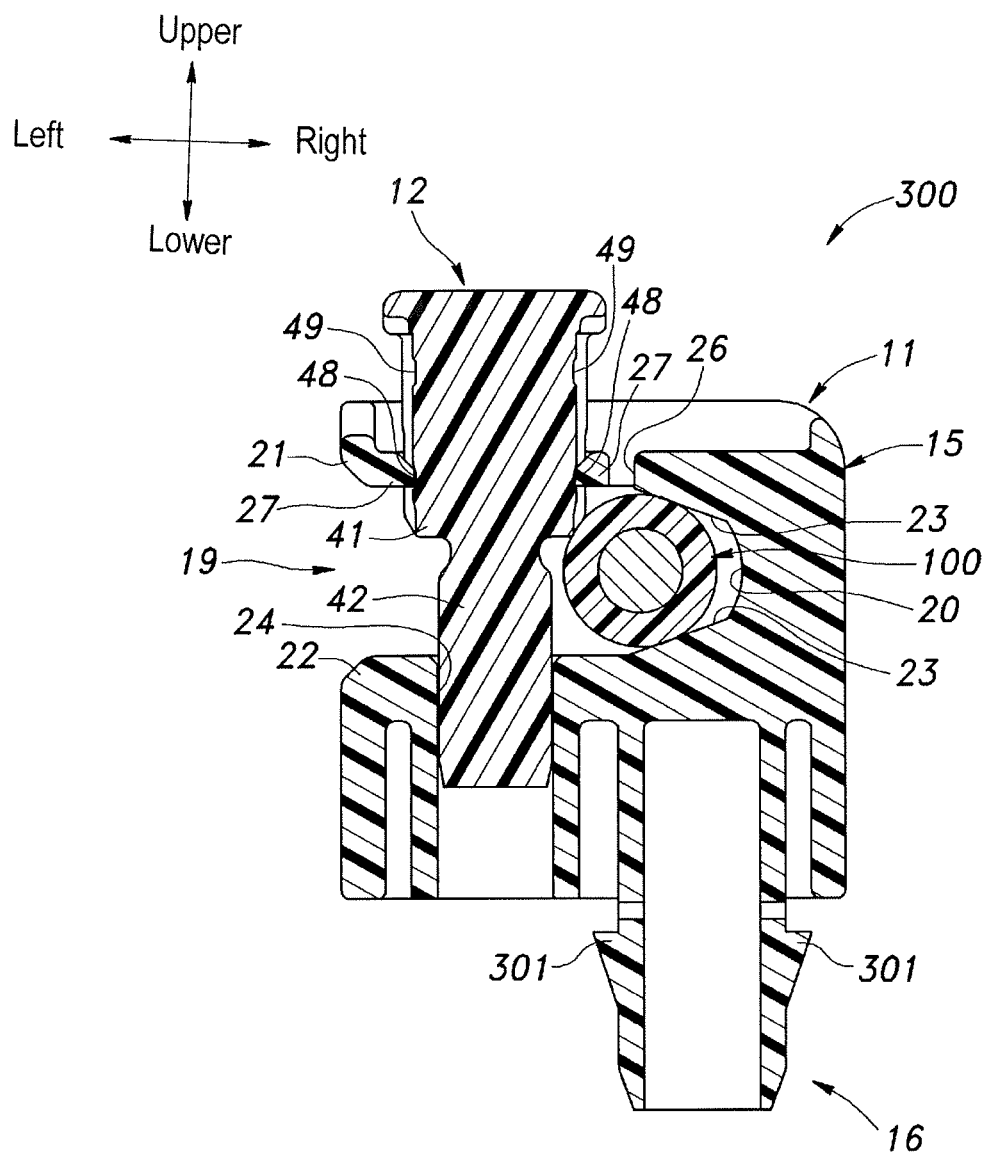
FIG. 8 is a cross-sectional view showing the temporarily fastened state of the cable by the clamp according to a third embodiment.

As shown in FIG. 8, a clamp 300 according to a third embodiment has a different structure in that the support hole 24 is not extended to the inside of the leg portion 16 compared to the clamps 10 and 200 according to the first and second embodiments. In the clamp 300, regarding the same structure as the clamp 10, the same reference numerals as the clamp 10 are assigned, and their explanations are omitted. In the clamp 300, there are provided elastic claws 301 (the elastic claws 201) with the same structure as the clamp 200 according to the second embodiment. In the clamp 300, unlike the clamp 200, the elastic claws 301 of the leg portion 16 do not receive the effect that the elastic claws 301 of the leg portion 16 are allowed to incline, or are prevented from inclining, by the position (the temporarily fastened position or the completely fastened position) of the clamping member 12. The clamp 300 can fix (completely fasten) a relative position between the cable 100 before the clamp 300 is engaged with the locking hole 106 of the vehicle body panel 101.

Fourth Embodiment

Figure 9:
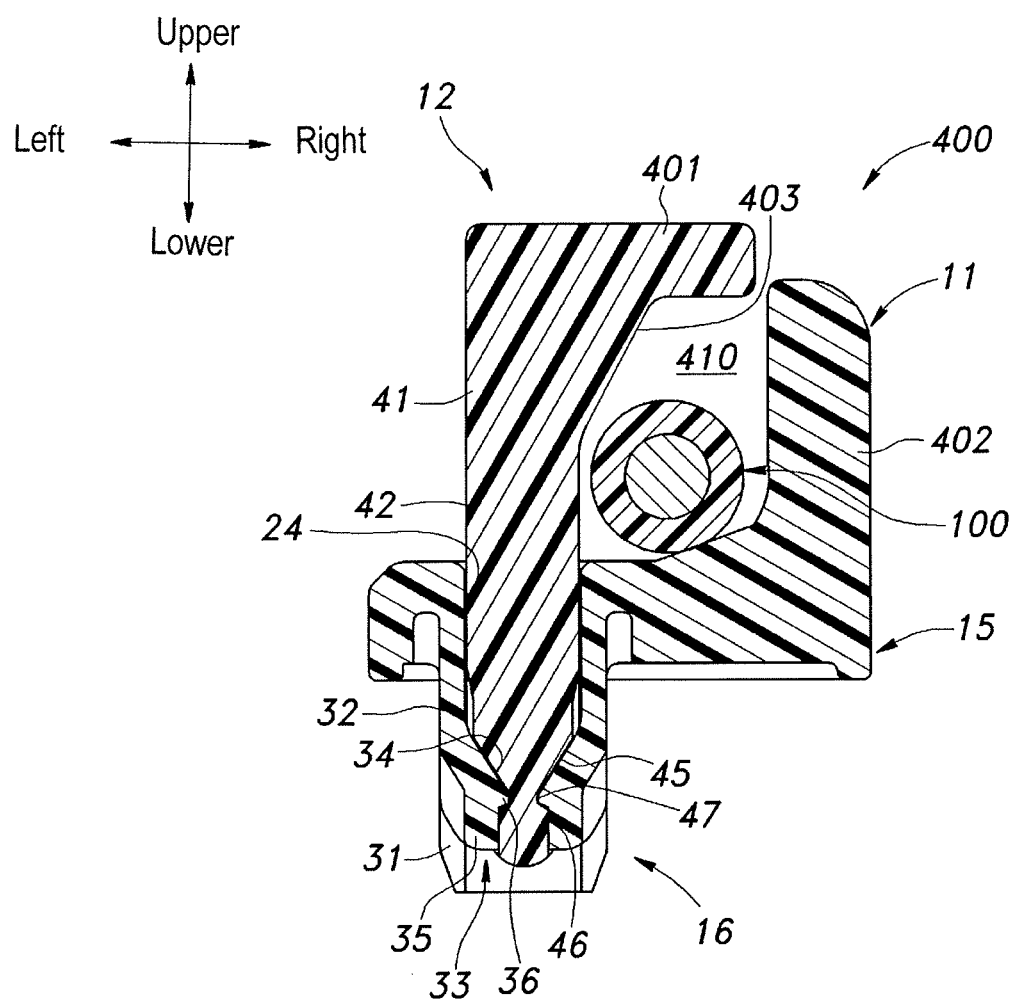
FIG. 9 is a cross-sectional view showing the temporarily fastened state of the cable by the clamp according to a fourth embodiment.

As shown in FIG. 9, a clamp 400 according to a fourth embodiment widely differs from the clamp 10 according to the first embodiment in that the base member 11 does not include the groove portion 19, and that there includes an expanded head portion 401 in the base end portion 41 of the clamping member 12. In the clamp 400, regarding the same structure as the clamp 10, the same reference numerals as the clamp 10 are assigned, and their explanations are omitted.

As shown in FIG. 9, the main body portion 15 of the base member 11 has a plate shape, and in a direction roughly parallel to the axis line direction of the support hole 24, and in an opposing direction to a leg portion 16 side, there is provided to protrude a wall portion (a receiving portion) 402. The base end portion 41 of the clamping member 12 includes a taper portion 403 in such a way as to protrude to a wall portion 402 side (a right side) as the base end portion 41 of the clamping member 12 goes to an upper end side. In an upper end thereof, there includes the expanded head portion 401 protruding to the wall portion 402 side (the right side).

In the state wherein the clamping member 12 is in the temporarily fastened position, a distance between the expanded head portion 401 and the wall portion 402 is made smaller than an outer diameter of the cable 100, so that the cable 100 cannot be disengaged from a housing space 410 demarcated by the base member 11 and the clamping member 12. When the clamping member 12 is pushed into the support hole 24, and is moved to the completely fastened position, the cable 100 is clamped between the expanded head portion 401 and the taper portion 403, and the main body portion 15 and the wall portion 402.

Fifth Embodiment

Figure 10:
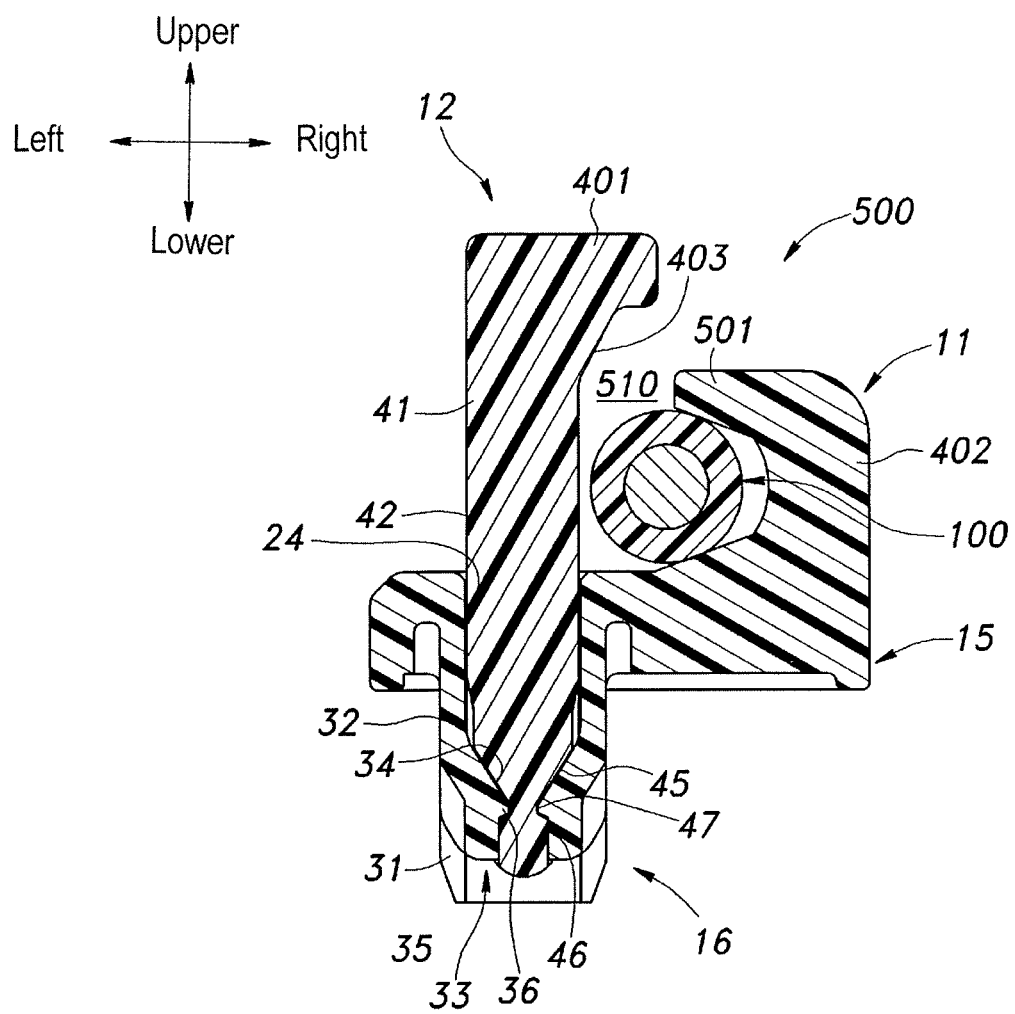
FIG. 10 is a cross-sectional view showing the temporarily fastened state of the cable by the clamp according to a fifth embodiment.

As shown in FIG. 10, a clamp 500 according to a fifth embodiment has a different shape of the expanded head portion 401 and a different shape of the wall portion 402 compared to the clamp 400 according to the fourth embodiment. In the clamp 500, regarding the same structure as the clamp 400, the same reference numerals as the clamp 400 are assigned, and their explanations are omitted. The clamp 400 includes a hook portion 501 protruding to a clamping member 12 side on an upper end of the wall portion 402. In the state wherein the clamping member 12 is in the temporarily fastened position, a distance between the expanded head portion 401 and the taper portion 403, and the hook portion 501 is made smaller than the outer diameter of the cable 100, so that the cable 100 cannot be disengaged from a housing space 510 demarcated by the base member 11 and the clamping member 12.

Sixth Embodiment

Figure 11:
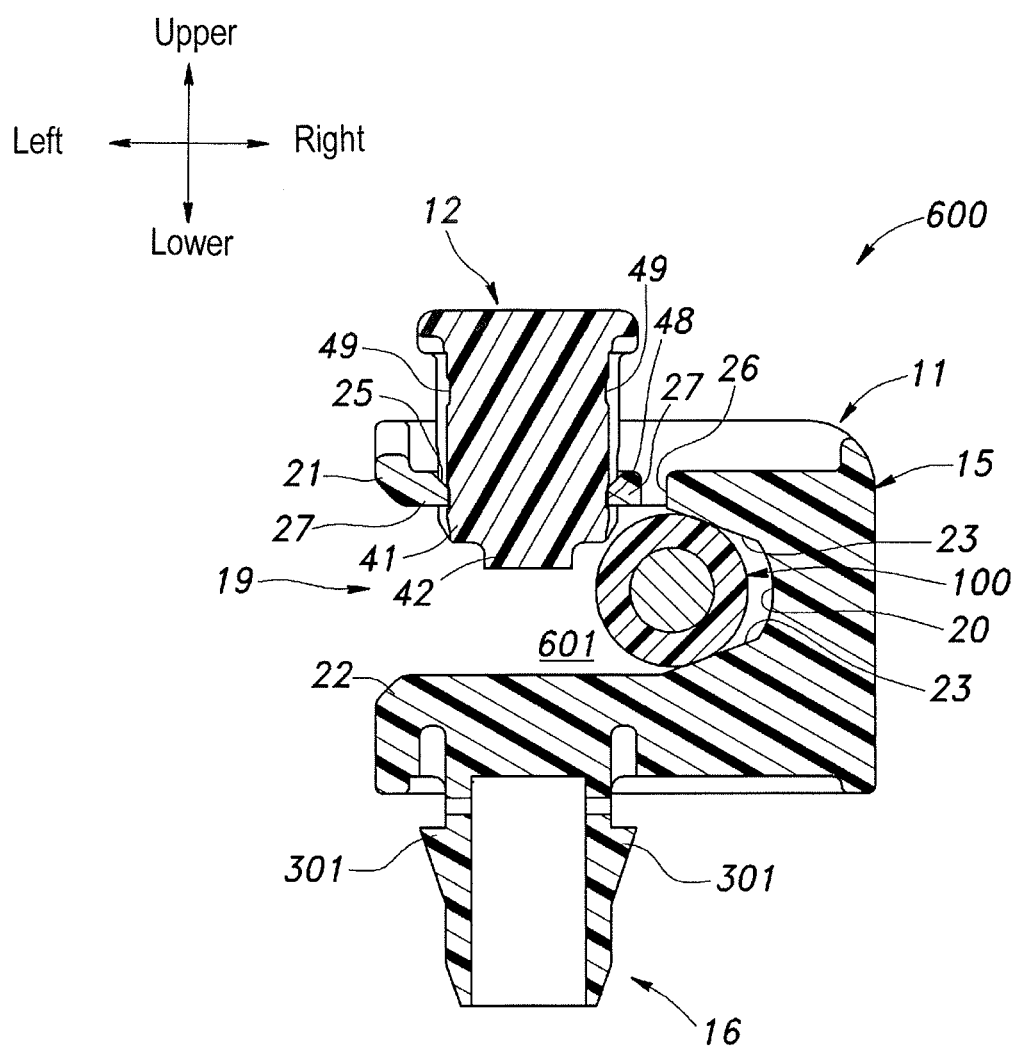
FIG. 11 is a cross-sectional view showing the temporarily fastened state of the cable by the clamp according to a sixth embodiment.

As shown in FIG. 11, a clamp 600 according to a sixth embodiment differs in that the support hole 24 is not formed in the base member 11, and that the insertion end portion 42 of the clamping member 12 is short, compared to the clamp 300 according to the third embodiment. In the clamp 600, regarding the same structure as the clamp 300, the same reference numerals as the clamp 300 are assigned, and their explanations are omitted. In the clamping member 12, in the temporarily fastened position, one portion of the base end portion 41 and the insertion end portion 42 protrude into the groove portion 19, and demarcate a space 601 whose one portion is open. The cable 100 is held displaceably in the space 601. As with the clamp 200, the clamping member 12 is pushed relative to the insertion hole 25 (which functions as a support hole for supporting the clamping member 12, and corresponds to the support hole in paragraph [0020]), and is displaced to the completely fastened position, so that a most part of the base end portion 41 proceeds into the groove portion 19, and the space 601 is reduced. Thereby, the cable 100 is clamped between the clamping member 12 and the bottom portion 20.

Seventh Embodiment

Figure 12:
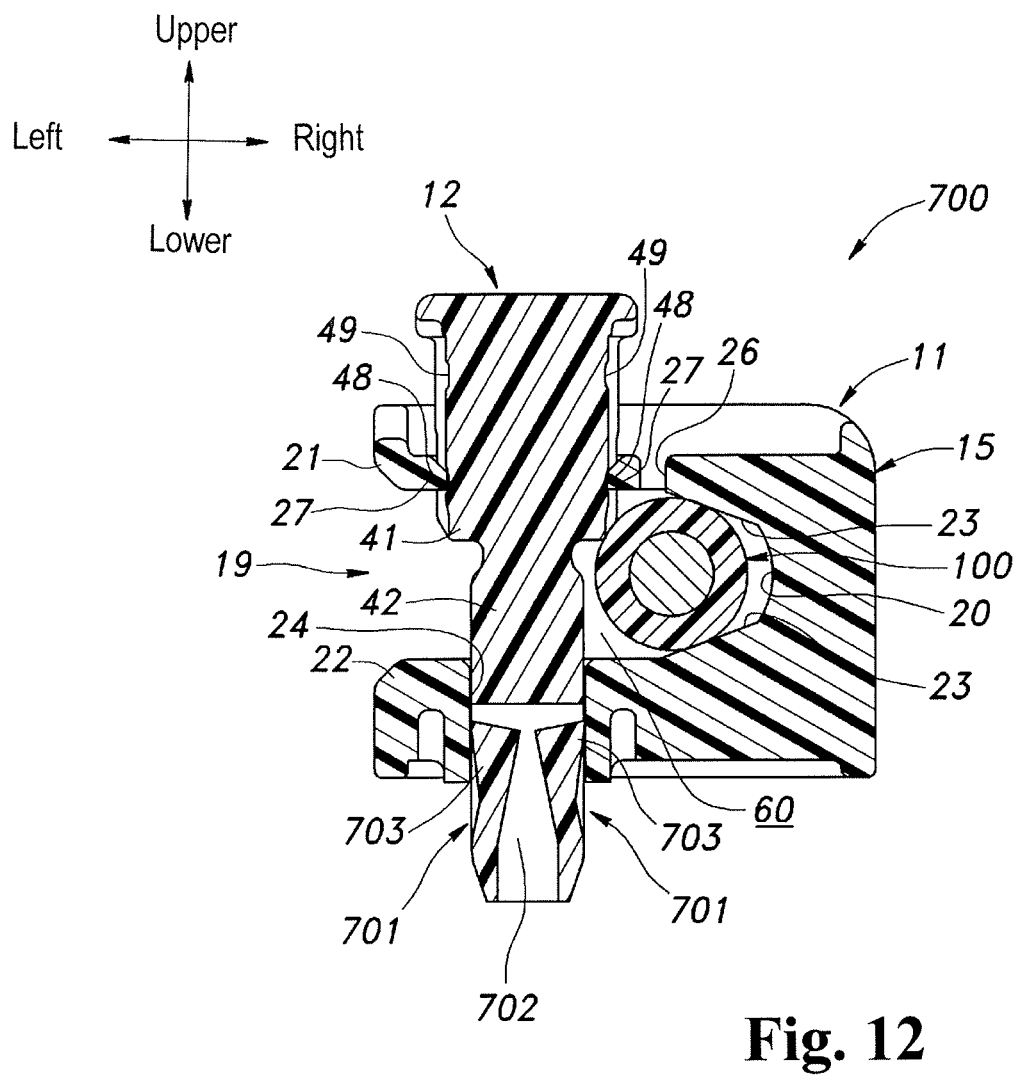
FIG. 12 is a cross-sectional view showing the temporarily fastened state of the cable by the clamp according to a seventh embodiment.

As shown in FIG. 12, a clamp 700 according to a seventh embodiment differs in that the base member 11 does not include the leg portion 16, and that elastic claws 701 engaging with the locking hole 106 of the vehicle body panel 101 are formed in the insertion end portion 42 of the clamping member 12, compared to the clamp 10 according to the first embodiment. In the clamp 700, regarding the same structure as the clamp 10, the same reference numerals as the clamp 10 are assigned, and their explanations are omitted. As shown in FIG. 12, the insertion end portion 42 includes a hollow portion 702, and includes a pair of the elastic claws 701 extending upward inside the hollow portion 702 from a lower end portion thereof. In the elastic claws 701, there are provided to protrude check claw portions 703 on outer surfaces thereof. Also, the check claw portions 703 have flexibility, and elastically deform so as to be capable of inclining to an inner side of the hollow portion 702.

As shown in FIG. 12, in the state wherein the clamping member 12 is in the temporarily fastened position, the check claw portions 703 are pressed against an inner wall of the support hole 24, and each elastic claw 701 comes to an inclined state into the hollow portion 702. Although it is not shown in the figures, in the state wherein the clamping member 12 is in the temporarily fastened position, when the insertion end portion 42 is inserted into the locking hole 106 of the vehicle body panel 101, and the clamping member 12 is pushed relative to the base member 11, the check claw portion 703 of each elastic claw 701 passes through the support hole 24 downwardly, and by a restoring force of the elastic claw 701, the check claw portion 703 protrudes to an outer side of the insertion end portion 42 so as to engage with the locking hole 106.

Eighth Embodiment

Figure 13:
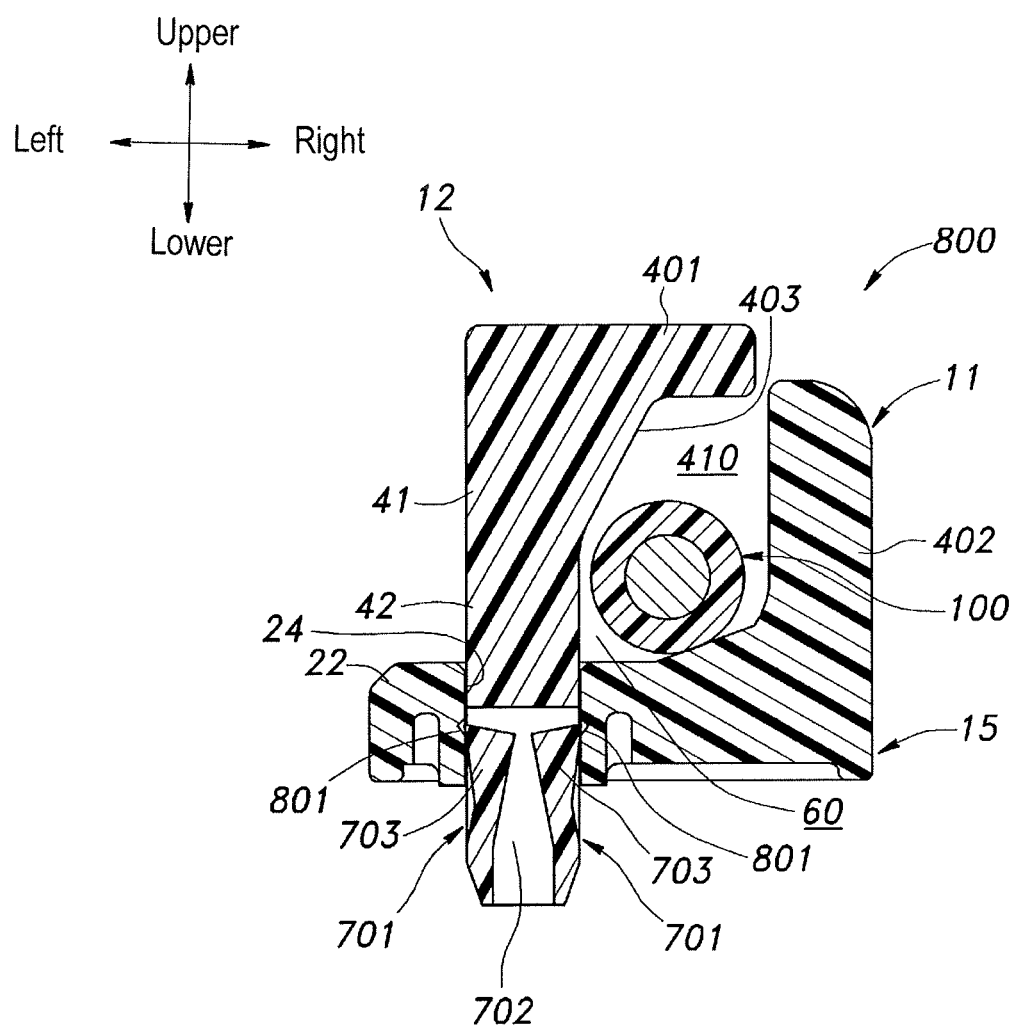
FIG. 13 is a cross-sectional view showing the temporarily fastened state of the cable by the clamp according to an eighth embodiment.

As shown in FIG. 13, a clamp 800 according to an eighth embodiment has a different shape of an upper portion of the base member 11 and a different shape of an upper portion of the clamping member 12, compared to the clamp 700 according to the seventh embodiment. The base member 11 of the clamp 800 includes the wall portion 402 as with the wall portion of the clamp 400 of the fourth embodiment, and the clamping member 12 includes the expanded head portion 401 and the taper portion 403. In the clamp 800, regarding the same structure as the clamp 700 and the clamp 400, the same reference numerals as the clamp 700 and the clamp 400 are assigned, and their explanations are omitted. Also, there are formed concave portions 801, in which the elastic claws 701 are caught, on a wall surface of the support hole 24 to hold the clamping member 12 in the temporarily fastened position relative to the base member 11.

Ninth Embodiment

Figure 14:
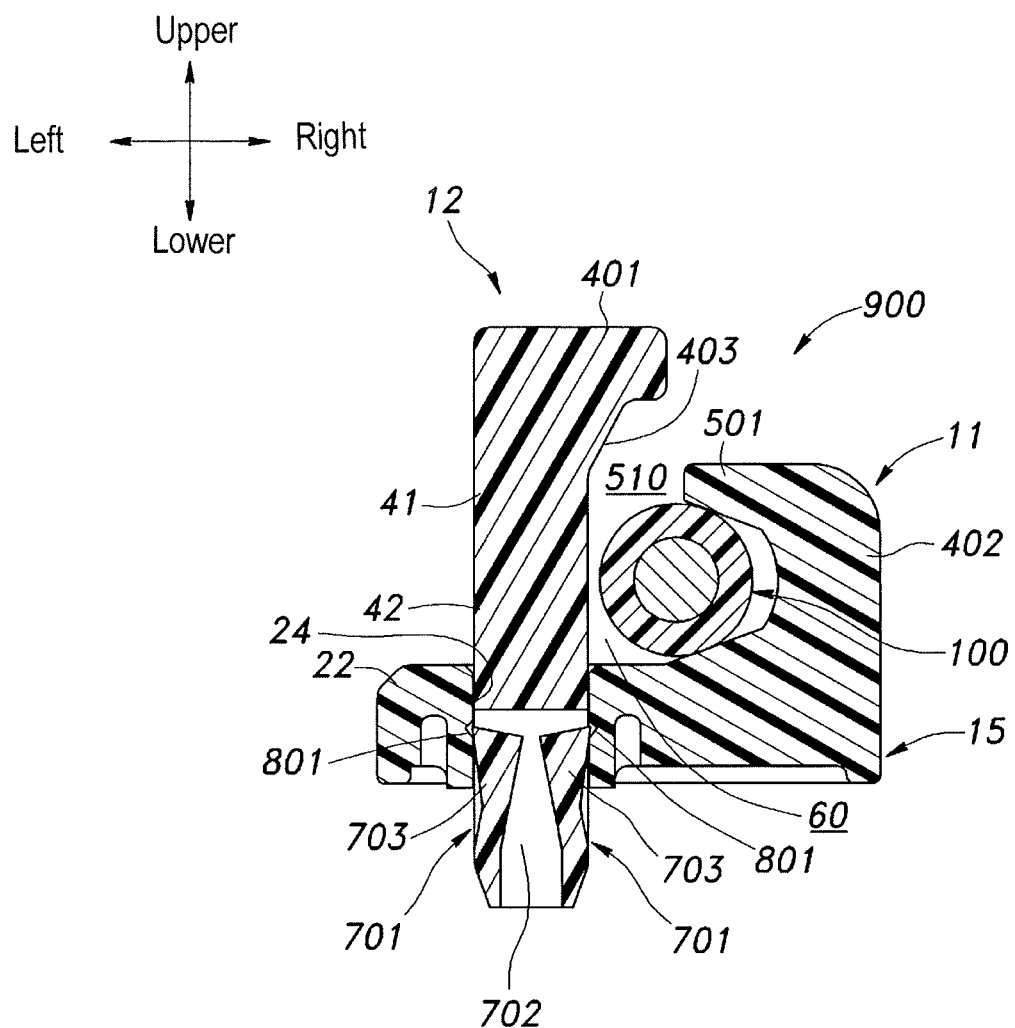
FIG. 14 is a cross-sectional view showing the temporarily fastened state of the cable by the clamp according to a ninth embodiment.

As shown in FIG. 14, a clamp 900 according to a ninth embodiment has a different shape of the expanded head portion 401 and a different shape of the wall portion 402, compared to the clamp 800 according to the eighth embodiment. The wall portion 402 includes the hook portion 501 as with the fifth embodiment. In the clamp 900, regarding the same structure as the clamp 800 and the clamp 500, the same reference numerals as the clamp 800 and the clamp 500 are assigned, and their explanations are omitted.

Tenth Embodiment

A clamp 1000 according to a tenth embodiment widely differs in that a clamping member 1001 is displaced between the temporarily fastened position and the completely fastened position by relatively rotating relative to a base member 1002, compared to the clamp 10 according to the first embodiment.

As shown in FIG. 15, a main body portion 1003 of the base member 1002 has a plate shape, and includes a circular support hole 1004 with a bottom on an upper face thereof; a wall portion (a receiving portion) 1006 provided to protrude upward, and comprising a hook portion 1005, extending to a support hole side, on an upper end; and a leg portion 1007 provided to protrude downwardly on a lower face thereof. The leg portion 1007 comprises a pair of elastic claws 1008 on lateral faces thereof, and can engage with the locking hole 106 of the vehicle body panel 101. The continuing main body portion 1003, wall portion 1006, and hook portion 1005 have a C shape, and the cable 100 can be housed inside the C shape. The clamping member 1001 includes an axis portion 1011 fitted into the support hole 1004 to be capable of rotating around a rotating center 1020; and an oval clamping portion 1012 provided in the same axis as the axis portion 1011. The clamping member 1001 is fitted into the base member 1002 after the cable 100 is disposed between the main body portion 1003, the wall portion 1006, and the hook portion 1005. When the clamping member 1001 is attached to the base member 1002, the cable 100 cannot be disengaged from a housing space 1015 demarcated by the main body portion 1003, the wall portion 1006, the hook portion 1005, and the clamping member 1001.

Figure 16:
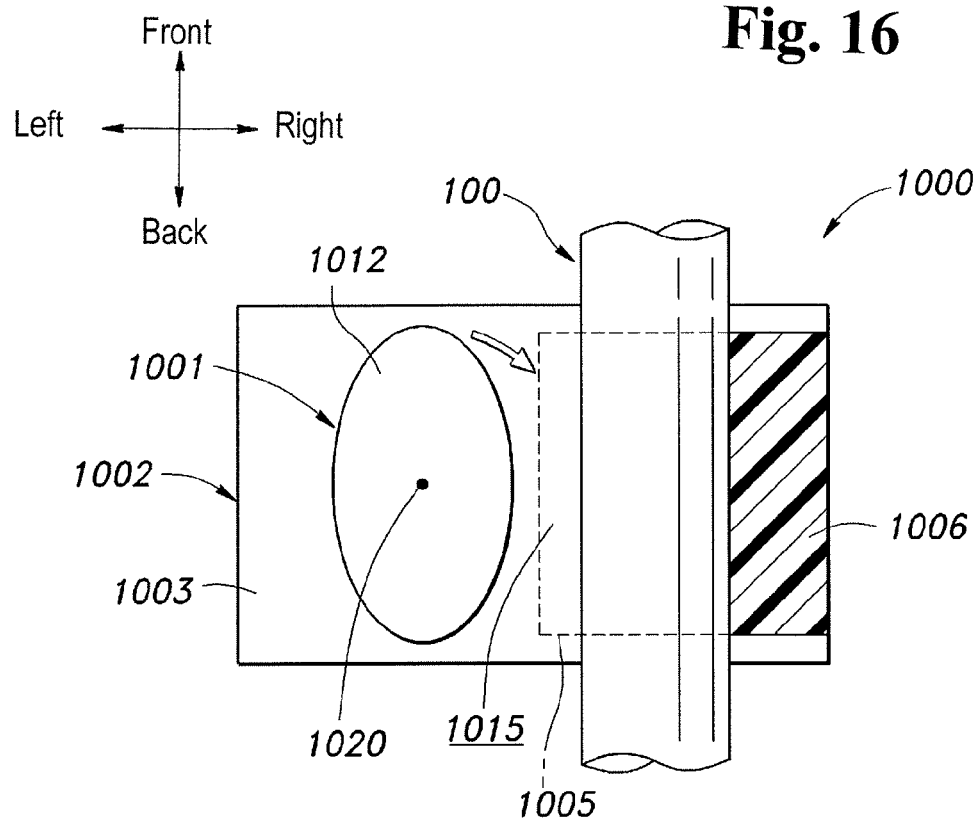
FIG. 16 is a cross-sectional view taken along a line XVI to XVI in FIG. 15.
Figure 17:
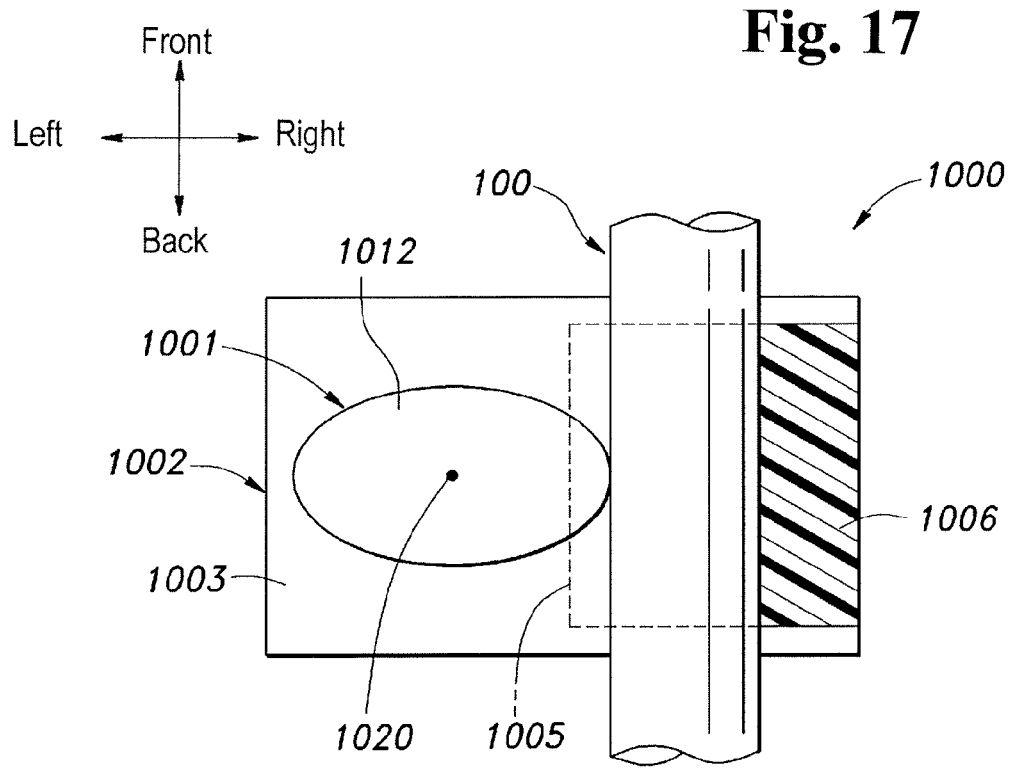
FIG. 17 is a cross-sectional view showing the completely fastened state of the cable by the clamp according to the tenth embodiment.

When the shortest distance between the clamping portion 1012 and the wall portion 1006 becomes the largest (the housing space 1015 becomes the largest), a rotational position of the clamping member 1001 relative to the base member 1002 is the temporarily fastened position (see FIGS. 15 and 16). When the shortest distance between the clamping portion 1012 and the wall portion 1006 becomes the smallest (the housing space 1015 becomes the smallest), a rotational position of the clamping member 1001 relative to the base member 1002 is the completely fastened position (see FIG. 17). When the clamping member 1001 is in the temporarily fastened position, the clamp 1000 can be relatively positioned relative to the cable 100. On the other hand, when the clamping member 1001 is in the completely fastened position, the cable 100 is clamped between the clamping portion 1012 and the wall portion 1006, and the clamp 1000 is fixed relative to the cable 100 in such a way that the clamp 1000 cannot be relatively positioned relative to the cable 100.

Hereinabove, the specific embodiments have been explained, however, the present invention is not limited to the above-mentioned embodiments, and can be widely modified. For example, the cable 100 may be a wire for electrical wiring, a pipe wherein a liquid such as oil and the like flows, or the like. Also, the vehicle body panel 101 as the attached member may be a structure body such as a trim made of a resin material and the like. Also, the attached member wherein the clamp is attached is not limited to a composition element of a vehicle body, and may be various structural objects such as a building, a device, and the like.

EXPLANATION OF SYMBOLS 10, 200, 300, 400, 500, 600, 700, 800, 900, and 1000 . . . a clamp; 11 and 1002 . . . a base member; 12 and 1001 . . . a clamp member; 15 . . . a main body portion; 16 . . . a leg portion; 19 . . . a groove portion; 20 . . . a bottom portion (a receiving portion); 21 . . . an upper wall portion; 22 . . . a lower wall portion; 23 . . . protrusions; 24 and 1004 . . . a support hole; 25 . . . an insertion hole; 27 . . . convex portions; 32 . . . elastic pieces; 33 . . . bulging portions; 36 . . . locking convex portions; 41 . . . a base end portion; 42 . . . an insertion end portion; 44 . . . receiving concave portions; 47 . . . locking concave portions; 48 . . . first locking concave portions; 49 . . . second locking concave portions; 60, 410, 510, and 1015 . . . a housing space; 100 . . . a cable; 101 . . . a vehicle body panel; 106 . . . a locking hole; 201 and 601 . . . elastic claws; 401 . . . an expanded head portion; 402 and 1006 . . . a wall portion; 403 . . . a taper portion; and 501 and 1005 . . . a hook portion

What is claimed is:

1. A clamp adapted to fix a cord-shaped body to an attached member with a locking hole, comprising:
a base member including a receiving portion adapted to be capable of abutting against at least one portion of an outer circumferential portion of the cord-shaped body, and a leg portion adapted to be engageable with the locking hole, the receiving portion defining a housing space with an opening adapted to receive the cord-shaped body from an upper side or a lateral side of the receiving portion; and
a clamping member supported in the base member to be capable of being displaced between a temporarily fastened position where the clamping member is positioned to close the opening, and a completely fastened position where the clamping member is further displaced downwardly from the temporarily fastened position, and reducing the housing space,
wherein the clamping member has an outer shape reducing the housing space when displacing the clamping member from the temporarily fastened position to the completely fastened position,
wherein one of the base member and the clamping member includes a convex portion and the other of the base member and the clamping member includes a concave portion, and the convex portion and the concave portion are engaged when the clamping member is positioned at the temporarily fastened position; and the convex portion is elastically deformed to displace the clamping member from the temporarily fastened position to the completely fastened position, and
wherein the base member includes one of the convex portion and the concave portion, arranged on one of wall portions extending from an upper end portion of the receiving portion, and the clamping member includes the other of the convex portion and the concave portion, arranged on a lower portion of a base end portion, and another of the other of the convex portion and the concave portion, arranged on an upper portion of the base end portion; and the one of the convex portion and the concave portion is engaged into the other of the convex portion and the concave portion when the clamping member is positioned at the temporarily fastened position, and the one of the convex portion and the concave portion is engaged into the another of the other of the convex portion and the concave portion when clamping member is positioned at the completely fastened position.

2. A clamp according to claim 1, wherein a support hole is formed in the base member, and
the clamping member includes the base end portion and an insertion end portion, and is supported to be capable of being displaced between the temporarily fastened position in which the insertion end portion is partly inserted into the support hole, and the completely fastened position in which the insertion end portion is completely inserted into the support hole
the clamping member includes a portion protruding outwardly toward the base end portion which reduces the housing space, and the base end portion protrudes most toward the receiving portion.

3. A clamp according to claim 2, wherein the base member includes a bottom portion and the wall portions respectively extending from two sides of the bottom portion, and facing each other;
the receiving portion is provided on the bottom portion; and
the support hole is formed in one of the two wall portions to face the other of the two wall portions, and an insertion hole, which is a through-hole, is formed in the other of the two wall portions to face the support hole, and the clamping member is inserted into the insertion hole and the support hole.

4. A clamp according to claim 2, wherein the receiving portion protrudes in a direction parallel to a longitudinal direction of the clamping member, and
the clamping member includes an expanded head portion protruding toward the receiving portion on the base end portion.

5. A clamp according to claim 4, wherein the receiving portion includes a hook portion protruding toward the clamping member from one end portion of the bottom portion.

6. A clamp according to claim 2, wherein the support hole extends into the leg portion, and
the leg portion is pressed by the clamping member when the clamping member is displaced from the temporarily fastened position to the completely fastened position, so that the leg portion is expanded to an outer side in a radial direction of the support hole.

7. A clamp according to claim 2, wherein the support hole extends into the leg portion,
the leg portion is adapted to be engageable with the locking hole and includes an elastic claw capable of inclining into the support hole, and
when the clamping member is in the temporarily fastened position, the clamping member allows the elastic claw to incline into the support hole, and when the clamping member is in the completely fastened position, the clamping member abuts against the elastic claw, and prevents the elastic claw from inclining into the support hole.

8. A clamp according to claim 1, wherein the base member includes the convex portion arranged on one of the wall portions extending from the upper end portion of the receiving portion, and the clamping member includes the concave portion arranged on the lower portion of the base end portion and further includes another concave portion arranged on the upper portion of the base end portion; and the convex portion is engaged into the concave portion when the clamping member is positioned at the temporarily fastened position, and the convex portion is engaged into the another concave portion when clamping member is positioned at the completely fastened position.

9. A clamp adapted to fix a cord-shaped body to an attached member with a locking hole, comprising:
  a base member including a receiving portion adapted to be capable of abutting against at least one portion of an outer circumferential portion of the cord-shaped body, a support hole which is a through-hole, the receiving portion defining a housing space with an opening adapted to receive the cord-shaped body from an upper side or a lateral side of the receiving portion, and two wall portions extending parallel to each other from two end portions of the receiving portion, the receiving portion and the two wall portions forming a U-shaped portion adapted to receive the cord-shaped body from the lateral side of the receiving portion between the two wall portions; and
  a clamping member including a base end portion and an insertion end portion, and passing through the support hole from the insertion end portion, the clamping member being supported in the base member to be capable of being displaced between a temporarily fastened position where the insertion end portion of the clamping member is inserted into the support hole to close the opening, and a completely fastened position where the insertion end portion of the clamping member is further inserted downwardly from the temporarily fastened position such that an insertion length entering into the support hole is longer than that of the temporarily fastened position, clamping member including a portion protruding from the support hole toward the base end portion of the clamping member reducing the housing space,
  wherein the base end portion protrudes most toward the receiving portion to reduce the housing space when the clamping member is displaced from the temporarily fastened position to the completely fastened position, and a portion of the insertion end portion passing through the support hole engages the locking hole,
  the clamping member includes one side portion facing the receiving portion and adapted to clamp the cord-shaped body between the one side portion and the receiving portion; and
  the one side portion at the base end portion of the clamping member is adapted to contact directly the cord-shaped body when the clamping member is positioned at the completely fastened position.

10. A clamp according to claim 9, wherein the clamping member includes an expanded head portion protruding toward the receiving portion on the base end portion.

11. A clamp according to claim 9, wherein one of the base member and the clamping member includes a convex portion and the other of the base member and the clamping member includes a concave portion, and the convex portion and the concave portion are engaged when the clamping member is positioned at the temporarily fastened position; and the convex portion is elastically deformed to displace the clamping member from the temporarily fastened position to the completely fastened position.

12. A clamp according to claim 11, wherein the base member includes the convex portion arranged on one of the wall portions extending from an upper end portion of the receiving portion, and the clamping member includes the concave portion arranged on a lower portion of the base end portion and further includes another concave portion arranged on an upper portion of the base end portion; and the convex portion is engaged into the concave portion when the clamping member is positioned at the temporarily fastened position, and the convex portion is engaged into the another concave portion when clamping member is positioned at the completely fastened position.

13. A clamp adapted to fix a cord-shaped body to an attached member with a locking hole, comprising:
  a base member including a receiving portion adapted to be capable of abutting against at least one portion of an outer circumferential portion of the cord-shaped body, and a support hole which is a through-hole, the receiving portion defining a housing space with an opening adapted to receive the cord-shaped body from an upper side or a lateral side of the receiving portion; and
  a clamping member including a base end portion and an insertion end portion, and passing through the support hole from the insertion end portion, the clamping member being supported in the base member to be capable of being displaced between a temporarily fastened position where the insertion end portion of the clamping member is inserted into the support hole to close the opening, and a completely fastened position where the insertion end portion of the clamping member is further inserted downwardly from the temporarily fastened position such that an insertion length entering into the support hole is longer than that of the temporarily fastened position, clamping member including a portion protruding from the support hole toward the base end portion of the clamping member reducing the housing space,
  wherein the base end portion protrudes most toward the receiving portion to reduce the housing space when the clamping member is displaced from the temporarily fastened position to the completely fastened position, and a portion of the insertion end portion passing through the support hole engages the locking hole,
  the receiving portion comprises a lower wall portion with said support hole, and a side wall portion extending upwardly from one end of the lower wall portion to form an L-shaped portion adapted to receive the cord-shaped body therein;
  the clamping member includes an expanded head portion arranged on an upper portion of the base end portion and protruding sideward therefrom, and a taper portion connecting the expanded head portion and tapered in a direction from the upper portion of the base end portion toward a lower portion of the base end portion; and
  when the clamping member is in the completely fastened position where the clamping member is fully inserted into the support hole of the lower wall portion, the expanded head portion is located adjacent the side wall portion adapted to cover and hold the cord-shaped body.

14. A clamp according to claim 13, wherein the base member further comprises a hook portion extending from an upper end portion of the side wall portion to face the lower wall portion, and the hook portion has a length shorter than the lower wall portion; and when the clamping member is positioned at the completely fastened position, the expanded head portion is located adjacent the hook portion adapted to cover and hold the cord-shaped body.

* * * * *